United States Patent [19]
Lehtonen

[11] 3,841,722
[45] Oct. 15, 1974

[54] AUTOMATIC GUIDE FOR ROLL
[75] Inventor: Lasse Lehtonen, Tampere, Finland
[73] Assignee: Oy Tampella Ab
[22] Filed: July 27, 1973
[21] Appl. No.: 383,051

Related U.S. Application Data
[63] Continuation of Ser. No. 235,241, March 16, 1972.

[52] U.S. Cl. .................................................. 308/59
[51] Int. Cl. ............................................ F16c 29/00
[58] Field of Search ............................... 308/58, 59

[56] References Cited
UNITED STATES PATENTS
1,230,591  6/1917  Merkel.................................. 309/59
3,079,805  3/1963  Rojecki................................. 309/59

*Primary Examiner*—Manuel A. Antonakas
*Assistant Examiner*—Frank Susko
*Attorney, Agent, or Firm*—Cushman, Darby & Cushman

[57] ABSTRACT

A roll support and adjustment mechanism for a wire or felt guide roll in a paper making machine has a linkage supporting a bearing at one end of the roll and pneumatic bellows for adjustably displacing the bearing. The linkage comprises a pair of links each pivotably connected to a support frame and to the free ends of the arms of an inverted Y-shaped bearing pedestal. The link pivot axes may be spatially related to ensure substantially linear displacement of the bearing.

11 Claims, 3 Drawing Figures

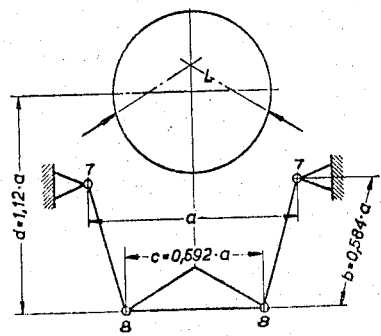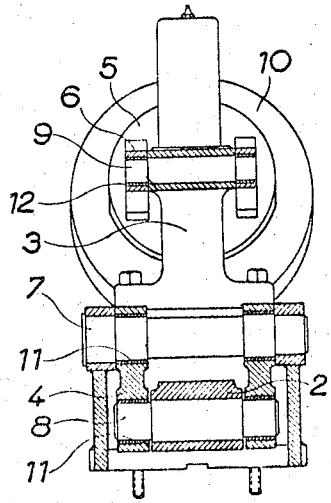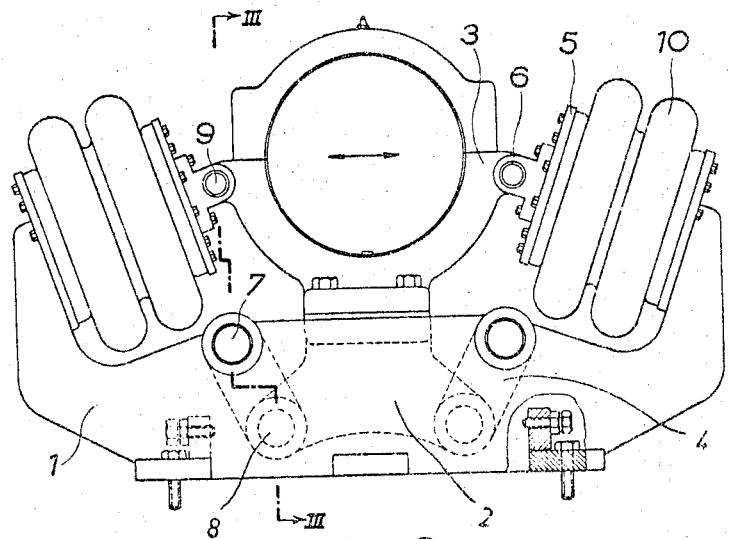

AUTOMATIC GUIDE FOR ROLL

This is a continuation, of U.S. Pat. application Ser. No. 235,241 filed Mar. 16, 1972.

The present invention relates to roll support and adjustment mechanisms and is particularly, but not exclusively, concerned with mechanisms for supporting wire or felt guide rolls in paper making machines.

To allow adjustment of the direction of the axis of a roll, it is known to incorporate in the mechanism supporting the roll means for adjusting the position of a bearing supporting one end of the roll.

It has been found in practice to be preferable to use a linkage for adjustably supporting the roll, since the use of wheels for this purpose has the disadvantage that dirt and the lateral forces exerted thereon during operation of the mechanism cause a risk that the wheels may tend to bind in their guides.

The use of a linkage has the further advantages that it does not obstruct free passage of the wire or felt either over the roll or under the roll, and that it allows the roll to be mounted in an oblique position.

Means for adjustably displacing the bearing are preferably aligned with the bearing housing so as to avoid moments which produce torques and consequential wedging forces.

It is also desirable that lubrication of the mechanism should be facilitated as much as possible and that the bearing should be easily replaceable, for example, to adapt the support and adjustment mechanism to use with different rolls of the same or different sizes.

It is accordingly an object of the present invention to provide a new and improved roll support and adjustment mechanism which at least partly meets these requirements.

According to the present invention, a roll support and adjustment mechanism comprises a linkage supporting a bearing at one end of a roll and means for adjustably displacing the bearing, the linkage comprising a pair of links each pivotably connected to a support frame and to a bearing pedestal of inverted Y-shape. To provide substantially horizontal linear displacement of the bearing, the links are pivotable relative to the support frame about axes spaced apart by a distance $a$, the links each having a length $b = 0.584a$ and the links being pivotable relative to the bearing pedestal about axes which are spaced apart by a distance $c = 0.592a$ and which are disposed at a vertical distance $d = 1.12a$ below the level of the axis of the bearing.

The adjustable displacement means comprise a pair of pneumatic bellows connected to the lower half of the bearing, and either one of the bellows employs a fixed internal pressure and the other a variable internal pressure, or both bellows have oppositely variable internal pressures, for effecting the displacement of the bearing.

Further objects, features and advantages of the present invention will be readily apparent to those skilled in the art from the following description of embodiments thereof, given by way of example with reference to the accompanying drawings, in which:

FIG. 1 shows a diagrammatic view in end elevation of a roll supporting and adjusting mechanism embodying the invention;

FIG. 2 shows a view corresponding to that of FIG. 1 but showing the mechanism in greater detail; and FIG. 3 shows a view taken in cross-section along the line III—III of FIG. 2.

Referring firstly to FIGS. 2 and 3, it will be seen that the roll support and adjustment mechanism illustrated therein has a support frame or bed 1 on which is mounted a bearing pedestal 2.

The bearing pedestal 2 has an inverted Y-shape and supports the upper and lower halves of a split bearing 3 in which one end of a roll (not shown) is journaled.

Two pairs of links 4 are pivotably connected to the support frame 1 and the bearing pedestal 2 for adjustably supporting the latter on the former, the links 4 being pivotably connected to the free ends of the arms of the inverted Y-shaped bearing pedestal 2 by pivot pins 7 and to the support frame 1 by pivot pins 8. Bearing shells 11 are provided between the pivot pins 7 and 8 and the links 4, as shown in FIG. 3.

Two plates 5 forming parts of pneumatic bellows 10 are pivotably connected by lugs 6 to the lower half of the bearing 3. The pneumatic bellows 10 are expansible and collapsible for displacing the bearing 3 as indicated by arrows in FIG. 2, and thereby altering the direction of the axis of the roll. The links 2 supporting the bearing pedestal 2 on the support frame 1 pivot relative to the bearing pedestal 2 and the support frame 1 to allow this displacement.

The axes about which the links 4 pivot are spatially related to one another and to the axis of the bearing 3 so that, if $a$ is the spacing between the axes of the pivot pins 7, about which the links 4 pivot relative to the support frame 1, then the distance $b$ between the axes of the pivot pins 7 and 8 of each link 4 is equal to $0.584a$, the distance $c$ between the axes of the pivot pins 8, about which the links 4 pivot relative to the bearing pedestal 2, is equal to $0.592a$, and the vertical distance $d$ of each of the axes of the pivot pins 8 below the level of the axis of the bearing 3 is equal to $1.12a$.

With this spatial relationship of the pivot axes, the bearing 3 is displaced substantially horizontally and linearly when the pneumatic bellows 10 are operated.

The pneumatic bellows 10 may be activated in either of two different ways. Firstly, one of these pneumatic bellows 10 may be maintained with a constant internal pressure (e.g. 1 atmosphere), while the internal pressure of the other pneumatic bellows 10 is adjusted (e.g. from 0–3 atmospheres) by a control valve.

Alternatively, the internal pressure in each of the pneumatic bellows may be varied in such a way that when one of these pressures increases, the other decreases.

With the above-described mechanism, the linkage supporting the bearing is disposed beneath the bearing and enables a low height structure to be designed, which is particularly advantageous when only a comparatively small space is available for accommodating the mechanism, e.g. beneath a paper making machine.

The mechanism, although compact, can be designed to provide a relatively large displacement of the bearing, particularly as some deviation from linear motion of the bearing is acceptable.

Only two pairs of links 4 are required, and the mechanism can be designed to provide movement of the bearing 3 in a straight line or along a curved path, the latter being advantageous in some cases for stretching the edges of the felt, while the former enables a doctor blade to be fitted. The mechanism in inexpensive compared with prior art arrangements, and requires no special housings for the pneumatic bellows 10, which provide a large displacement.

We claim:

1. A roll support and adjustment mechanism, comprising:
   a. journal bearing adapted to receive and to rotatably support one cylindrical end part of a roll;
   b. support means for said bearing disposed completely to a first side of a diametrical plane containing an axis of said bearing, said plane defining first and second regions of said bearing disposed on first and second sides of said plane, respectively;
   c. a mechanical linkage connecting said first region of said bearing to said support means and disposed completely to said first side of said diametrical plane; and
   d. pneumatic motor means arranged to act between said support means and said first region of said bearing and disposed for the most part on said first side of said diametrical plane, and effective to cause movement of said axis in said diametrical plane; said mechanical linkage comprising links pivotally connected between said first region of said bearing and said support means and of such lengths that during this movement of said axis, said axis remains in said diametrical plane.

2. A roll support and adjustment mechanism as claimed in claim 1, wherein said pneumatic motor means comprises a pair of pneumatic bellows and said pneumatic bellows are each connected to the lower half of said bearing.

3. A roll support and adjustment mechanism as claimed in claim 1, wherein said pneumatic motor means comprises a pair of pneumatic bellows and said pneumatic bellows are each connected to the lower half of said bearing.

4. A roll support and adjustment mechanism as claimed in claim 1, wherein said pneumatic motor means comprises a pair of pneumatic bellows and said pneumatic bellows are each connected to the lower half of said bearing.

5. A roll support and adjustment mechanism as claimed in claim 1, wherein said pneumatic motor means comprises a pair of pneumatic bellows and said pneumatic bellows are each connected to the lower half of said bearing.

6. A roll support and adjustment mechanism as claimed in claim 1, wherein said bearing is provided on a pedestal of inverted Y-shape having two arms, and said links are respectively pivotally connected to free ends of the two arms.

7. A roll support and adjustment mechanism as claimed in claim 6, wherein said links are pivotable relative to said support means about axes spaced apart by a distance $a$, said links each having a length $b = 0.584a$ and said links being pivotable relative to said bearing about axes which are spaced apart by a distance $c = 0.592a$ and which are disposed a distance $d = 1.12a$ from said diametrical plane.

8. A roll support and adjustment mechanism as claimed in claim 6, wherein said pneumatic motor means comprises a pair of pneumatic bellows and said pneumatic bellows are each connected to said first region of said bearing.

9. A roll support and adjustment mechanism as claimed in claim 1, wherein said links are pivotable relative to said support means about axes spaced apart by a distance $a$, said links each having a length $b = 0.584a$, and said links being pivotable relative to said bearing about axes which are spaced apart by a distance $c = 0.592a$ and which are disposed a distance $d = 1.12a$ from said diametrical plane.

10. A roll support and adjustment mechanism as claimed in claim 1 wherein said pneumatic motor means comprises a pair of pneumatic bellows and said pneumatic bellows are each connected to said first region of said bearing.

11. A roll support and adjustment mechanism, comprising:
    a. a journal bearing adapted to receive and to rotatably support one cylindrical end part of a roll;
    b. a first arcuate part of said journal bearing;
    c. a second arcuate part of said journal bearing engaging said first part along a diametrical plane passing through an axis of said bearing;
    d. support means for said bearing disposed completely to a first side of said diametrical plane;
    e. a mechanical linkage connecting said first part of the bearing to said support means and disposed completely to said first side of said diametrical plane; and
    f. pneumatic motor means arranged to act between said support means and said first part of the bearing and disposed for the most part on said first side of said diametrical plane, and effective to cause movement of said axis in said plane; said mechanical linkage comprising links pivotally connected between said first part of the bearing and said support means and of such lengths that during said movement of said axis, said axis remains in said plane.

* * * * *

UNITED STATES PATENT OFFICE
CERTIFICATE OF CORRECTION

Patent No. 3,841,722          Dated October 15, 1974

Inventor(s) Lasse Lehtonen

It is certified that error appears in the above-identified patent and that said Letters Patent are hereby corrected as shown below:

In the Heading:

[30] Foreign Application Priority Data

March 16, 1971     Finland     751/71

Signed and sealed this 6th day of May 1975.

(SEAL)
Attest:

RUTH C. MASON
Attesting Officer

C. MARSHALL DANN
Commissioner of Patents
and Trademarks